United States Patent [19]

Little

[11] 4,249,282
[45] Feb. 10, 1981

[54] RETRACTABLE CASTER
[75] Inventor: Carl H. Little, Chautauqua, N.Y.
[73] Assignee: Emerson Electric Co., St. Louis, Mo.
[21] Appl. No.: 114,060
[22] Filed: Jan. 21, 1980
[51] Int. Cl.³ .............................................. B60B 33/06
[52] U.S. Cl. ...................................... 16/32; 280/43.1
[58] Field of Search .......................... 16/32, 29, 19, 18; 280/43, 14

[56] References Cited
U.S. PATENT DOCUMENTS

| | | | |
|---|---|---|---|
| 1,017,464 | 2/1912 | Rae | 16/32 |
| 2,737,682 | 3/1956 | Holtz | 16/32 |
| 3,260,533 | 7/1966 | Ryder | 280/43.1 |

Primary Examiner—Doris L. Troutman
Attorney, Agent, or Firm—Polster, Polster and Lucchesi

[57] ABSTRACT

A retractable caster adapted to be secured, for example, to the legs of a power tool support stand so that with the casters in their lowered positions, the stand is rollingly supported on the casters, and with the casters raised, the support stand rests firmly and solidly on the floor. The retractable caster includes a rod which extends outwardly from the caster, the rod being engageable by the operator's foot to lower the caster into engagement with the floor, to lift the support stand clear of the floor, and to lock the caster in its lowered position with the stand rollingly supported on the caster.

9 Claims, 7 Drawing Figures

LOWERED POSITION

RESTRICTED POSITION

RETRACTED POSITION.

LOWERED POSITION.

LOWERED POSITION.

RETRACTABLE CASTER

BACKGROUND OF THE INVENTION

This invention relates to retractable casters, and more particularly to retractable casters which are oftentimes utilized to support a relatively heavy object, such as a power tool (e.g., a radial arm saw or table saw), on rollers or casters so that the object may be readily rolled to a desired location, then the casters may be retracted so that the object or machine rests solidly on the floor during operation.

Heretofore, certain prior art retractable casters included a caster frame securable to the frame of the power tool support stand. Each of these prior art retractable caster assemblies included a caster which was selectively raised and lowered by means of a screw jack arrangement provided on the stem of the caster (see FIG. 1). However, this screw jack arrangement was required to be operated by hand and took a considerable time (e.g., a minute or more) to raise and lower each caster. Of course, since the screw jack was located near floor level, operation thereof required the operator to bend over in an uncomfortable position for the several minutes required to operate the several casters as are typically installed on the power tool. Still further, the casters would not always be uniformly lowered to the same level when in their lowered positions so that the power tool would rock on the casters.

Another known prior art, foot actuated, retractable caster arrangement involved the use of shaft journalled at each end of the power tool support stand near floor level. This shaft was rotated by means of a foot pedal or lever and the shaft carried a pair of rotary cams which cammingly engaged casters so as to force them downwardly and to lift the support stand up from the floor. Typically, one of these cam shafts and a pair of retractable casters was provided at each end of the power tool support stand. Upon rotation of the cam shaft and cams in opposite direction, the caster was permitted to move downwardly and to bear solidly on the floor. While this foot operated retractable caster arrangement could optionally be fitted on a power tool support stand (i.e, retrofitted thereon), it is relatively expensive to manufacture and cannot be readily adapted to fit a variety of machine frames and different sizes of power tool support frames.

Still further, reference may be made to U.S. Pat. No. 3,687,239 issued to W. G. Moehlenpah which discloses rollers raised and lowered by means of a foot operated pedal for rollingly supporting a work stand on a track. This last mentioned roller arrangement is broadly similar to the above-mentioned foot operated retractable caster arrangement intended for use with power tool support stands or the like.

Among the several objects and features of the present invention may be noted that the provision of a retractable caster assembly adapted to be readily installed on an object (e.g., on a power tool support stand or the like) which when in its lowered position rollingly supports the object and which when retracted permits the object to rest solidly on the floor;

The provision of such a retractable caster assembly which is foot operated, which may be quickly raised and lowered, and which is consistently and accurately moved to a predetermined lowered position;

The provision of such a caster assembly which automatically and positively locks the caster in its lowered position when the retractable caster is actuated;

The provision of such a caster assembly which may be readily adapted for use with a wide variety of sizes and designs of objects to be supported thereby;

The provision of such a caster assembly which is of rugged and economical construction, which is economical to manufacture, and which is reliable in operation.

Other objects and features of this invention will be in part apparent and in part pointed out hereinafter.

SUMMARY OF THE INVENTION

Briefly stated, the retractable caster assembly of the present invention is intended for readily supporting an object, such as a power tool or the like, so as to enable the object to be readily rolled on the floor. The caster assembly includes a caster frame adapted to be rigidly secured to the object and a caster carried by the caster frame movable relative thereto between a raised retracted position in which the caster is substantially free of the weight of the object and in which the object adjacent the caster assembly solidly bears on the floor, and a lowered position in which the caster bears on the floor and rollingly supports at least part of the weight of the object. More specifically, the improvement of this invention relates to the caster frame having a pair of side walls, one of the side walls having a generally vertically extending slot therein. A bar is pivotally secured to the other of the side walls and extends from this other side wall and through the slot in the one side wall and out beyond the one side wall. The slot has a generally vertical portion and a horizontal portion offset from the vertical portion. The caster has a stem slidably received in the caster frame and cammingly engageable by the bar as the bar is pivotally moved downwardly within the vertical slot portion thereby to effect movement of the caster relative to the caster frame toward its lowered position. With the caster in its lowered position, the bar is movable in sidewise direction from the vertical slot portion into the horizontal slot portion thereby to lock the caster in its lowered position.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
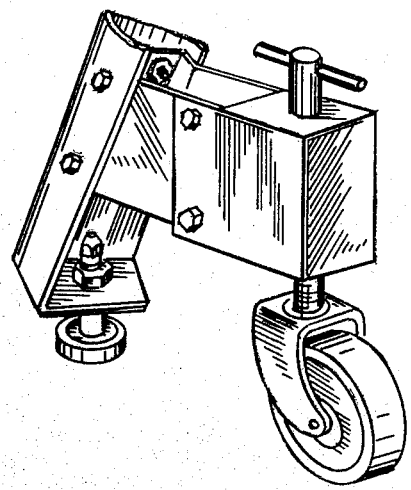
FIG. 1 is a perspective view of the lower portion of the leg of a support stand for a power tool or the like having a prior art retractable caster assembly secured thereto, the prior art caster assembly having a caster raised and lowered by means of a screw jack arrangement.
Figure 2:
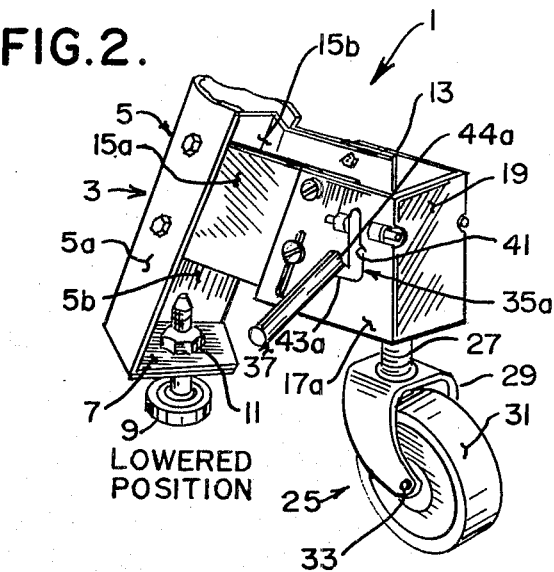
FIG. 2 is a perspective of the lower portion of a power tool support stand leg having a retractable caster assembly of the present invention in which the caster is raised and lowered by means of a foot operated rod or lever.

Referring now to the drawings, and particularly to FIGS. 2–7, a retractable caster assembly of the present invention is illustrated in its entirety at reference character 1, and as shown in FIG. 2, is rigidly secured to an object, as generally indicated at 3, to be rollingly supported by the caster. More particularly, object 3 is herein shown to be the leg of the support stand which supports a radial arm saw, table saw, band saw, or other power tool at a convenient work height. As shown, the stand includes a leg 5 generally angular-shaped in cross-section and having a first flange 5a, and a second flange 5b, and a bottom gusset 7 rigidly secured between the flanges at the bottom leg. An adjustable foot 9 is carried by gusset 7 and may be locked in place relative thereto by means of lock nuts 11. Of course, foot 9 may be adjusted in height so as to solidly support the object.

Figure 3:
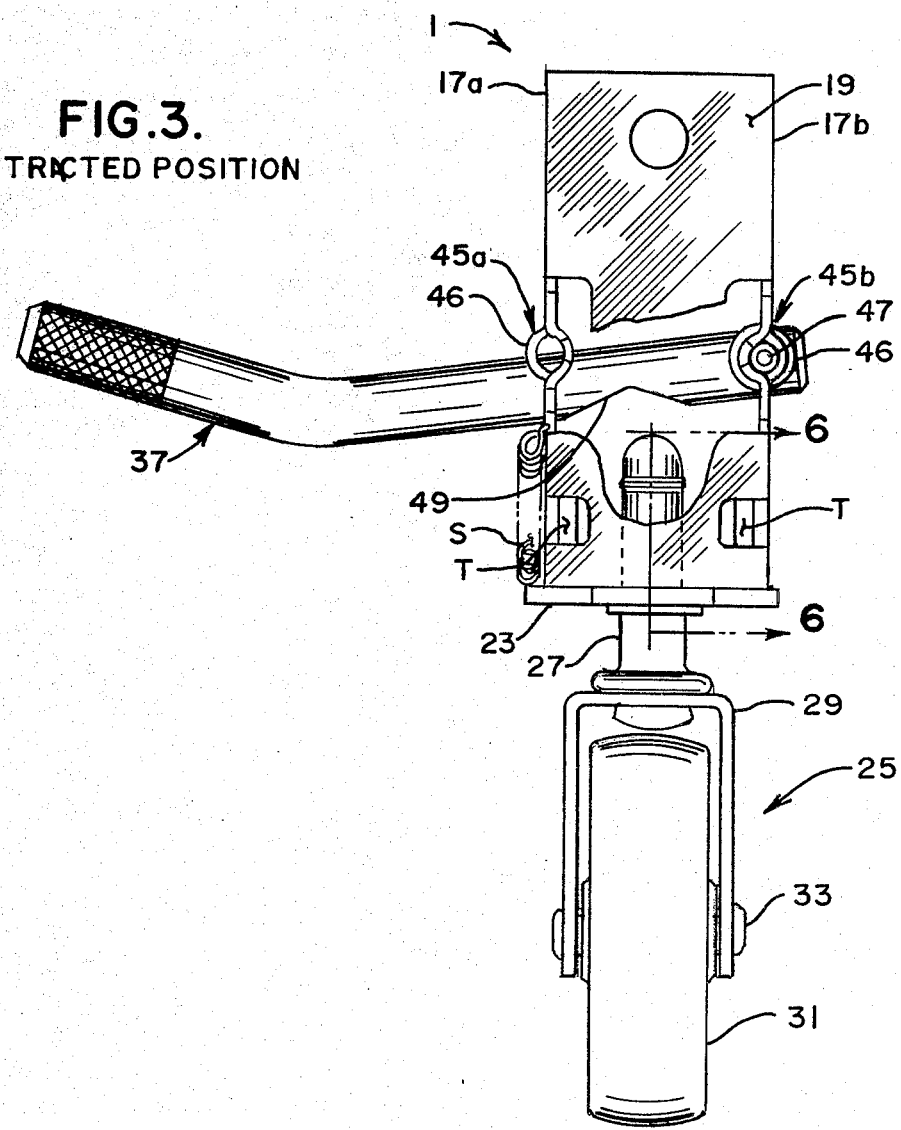
FIG. 3 is an enlarged rear elevational view of the retractable caster assembly of the present invention as shown in its raised retracted position with the lever clear of the caster.
Figures 4, 5:
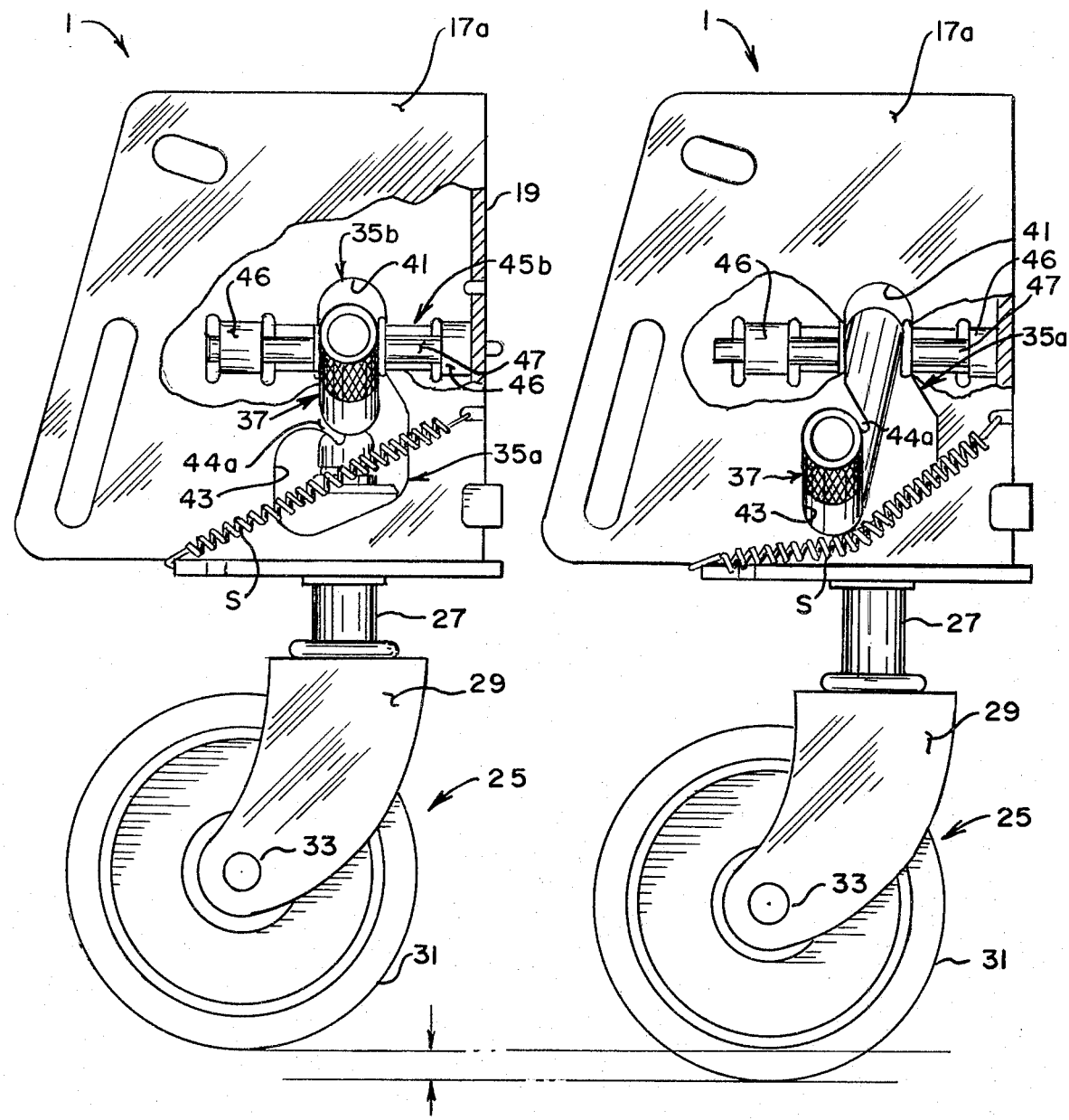
FIG. 4 is a left side elevational view of the caster assembly as shown in FIG. 3 with the caster in its raised retracted position.
FIG. 5 is a view similar to FIG. 4 illustrating the caster in its lowered position.
Figure 7:
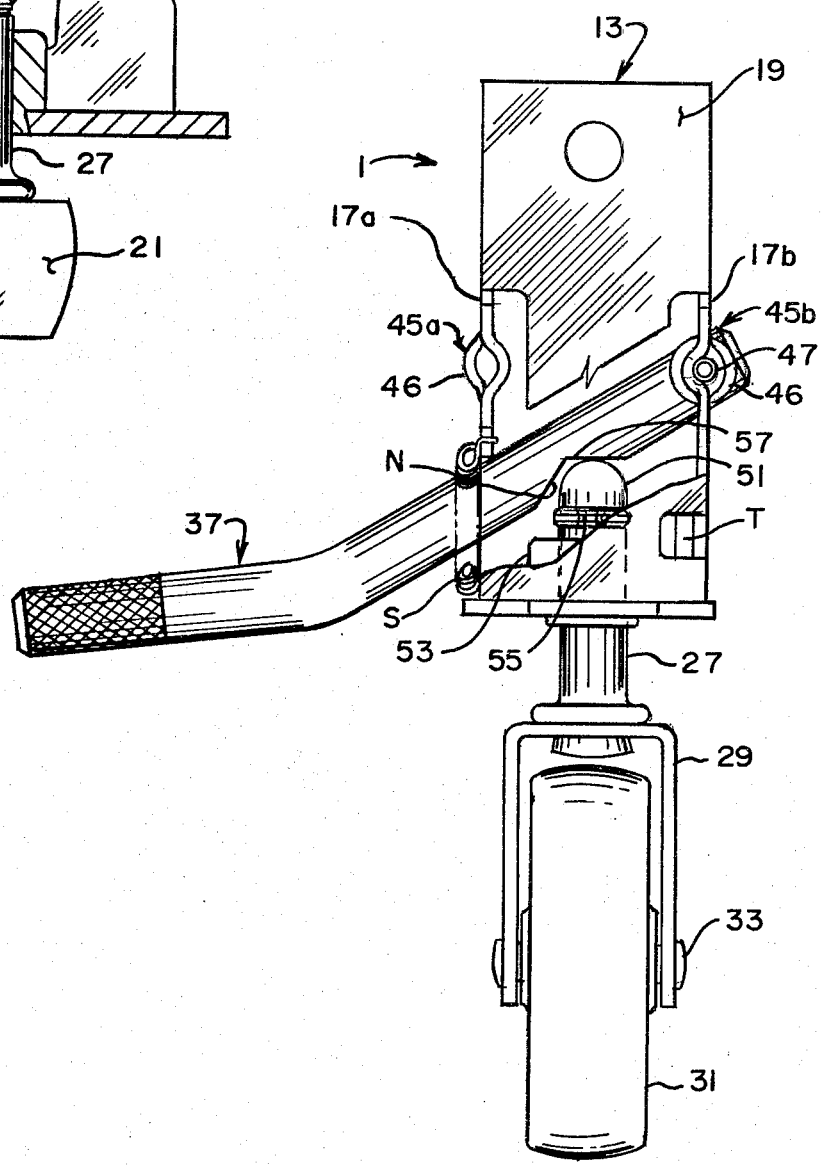
FIG. 7 is a view similar to FIG. 3 illustrating the caster assembly of the present invention in its lowered position.

Referring again to caster assembly 1 of the present invention, it is shown to comprise a caster frame as generally indicated at 13. The caster frame is adapted to be rigidly secured or bolted to flanges 5a and 5b of object leg 3 by means of caster brackets 15a, 15b. The caster frame is shown to include a pair of spaced side walls 17a, 17b, a rear end wall 19, and a bottom base wall 23. A caster wheel assembly 25 is mounted in the caster frame for movement between a lowered position (as shown in FIGS. 2, 5, and 7) in which the bottom of the caster wheel extends below the level of foot 9 and rollingly engages the floor so as to rollingly support object 3 and a raised retracted position (as shown in FIGS. 3 and 4) in which the caster wheel assembly is above the bottom of foot 9 and in which the caster wheel assembly is substantially free of weight of object 3 and in which the weight of the object is carried by foot 9 adjacent the caster assembly. More particularly, caster wheel assembly 25 is shown to comprise a stem 27 extending rigidly upwardly from a yoke 29. A roller or wheel 31 is journalled within yoke 29 on an axle 33.

In accordance with this invention, each side wall 17a, 17b of caster frame assembly 13 is provided with a generally J-shaped slot, as generally indicated at 35a, 35b, respectively. A bar or lever, as generally indicated at 37 is pivotally secured to one of the side walls in a manner as will appear and extends from this one side wall (e.g., side wall 17b) through slot 35a in the opposite side wall 17a and extends out beyond side wall 17a, as shown in FIGS. 2 and 3. More specifically, each slot 35a or 35b has a corresponding generally vertical section 41 forming the generally vertical portion of the J-shaped slot and a horizontally offset portion 43 forming the hook portion of the J-shaped slot. It will be particularly noted in FIGS. 4 and 5 that each side wall 17a, 17b has a respective tab 44a or 44b which defines the inter-section between vertical slot portion 41 and the horizontally offset portion of the slot 43. Thus, tabs 44a, 44b require the lever to be moved at least partially downwardly before it can be moved from horizontal slot portion 43 into vertical slot portion 41. As will be pointed out hereinafter, this serves to positively hold (or lock) the pivoted bar lever within the horizontal portion of the slot.

As is best shown in FIGS. 3 and 4, bar 37 is pivotally mounted to side wall 17b by means of a hinge 45b formed in side wall 17b. A similar hinge connection 45a is provided in side wall 17a. Each of the hinge connections include hinge pin apertures 46 formed in side walls 17a, 17b on either side of the vertical portions 41 of the respective slots 35a, 35b. A hinge pin hole (not shown) as provided in the inner end of bar 37 and is preferably offset from the longitudinal centerline of the bar. A hinge pin 47 is inserted through hinge apertures 46 in wall 17b and is received within this hinge pin hole in the inner end of bar 37 thereby to pivotally mount the bar with respect to side wall 17b for pivotal movement in a generally vertical plane. In accordance with this invention, the hinge pin hole provided in the end of bar 37 is somewhat larger in cross-section than hinge pin 47 thereby to permit at least partial horizontal swivelling movement of the bar as it is mounted on the hinge pin thereby enabling the bar to move vertically upwardly and downwardly in vertical slot portion 41 of slot 35a and also to move generally horizontally in and out of the horizontal portion 43 of the slot.

Figure 6:
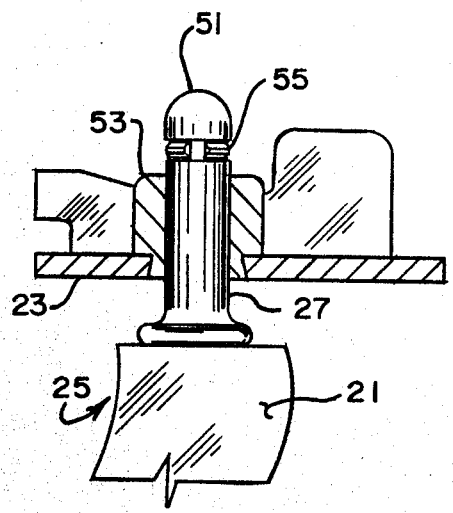
FIG. 6 is a vertical cross-sectional view taken along line 6—6 of FIG. 3 illustrating the manner in which the caster is slidably mounted to the caster frame for movement between its raised retracted and lowered positions.

Referring now particularly to FIGS. 6 and 7, it will be noted that the upper end of the stem 27 of the caster wheel assembly 25 is rounded and that the caster stem is slidably received in a bushing 53 fixedly held in place in an opening provided in bottom base wall 23 of caster frame 13. A stop ring 55 is provided in a circumferential groove in the upper end of stem 27 thereby to prevent the caster wheel assembly from falling downwardly through the bore of bushing 53.

As is best shown in FIG. 7, a notch N is coined on the underside of the bar 37 generally proximate the location at which the lower side of the bar engages the rounded upper end 51 of caster stem 27 upon the bar moving downwardly in slot 37a. More specifically, notch N includes an upper surface 57 which cammingly engages the rounded end 51 of the caster stem as bar 37 is moved downwardly in vertical slot portion 41 thereby to forceably push stem 27 and hence caster wheel assembly 25 downwardly relative to caster frame 13 and to thus effect movement of the caster assembly toward its lowered position. As the bar 37 approaches the lower end of vertical portion 41 of its slot 35a, the bar may be swivelled in generally horizontal direction for reception in horizontal slot portion 43. An extension spring S is engaged by bar 37 as it moves downwardly in vertical slot portion 41 and thus biases the bar upwardly. As the bar moves into horizontal slot portion 43, both the weight of object 3 now borne by caster wheel assembly 25 and the force of spring S will positively bias the bar upwardly in slot portion 43. Tab 44a prevents the bar from moving back into vertical portion 41 of slot 35a and thus the caster wheel assembly is positively retained in its locked lowered position.

In operation with caster assemblies 1 installed on the object 3 to be supported thereby, the operator only need place his foot on the outer end of the bar 37 of a respective caster assembly and push downwardly on the bar thereby causing the bar to cammingly engage the upper end 51 of caster stem 27 and to force the caster assembly downwardly into engagement with the floor. Once wheel 31 engages the floor, further downward movement of bar 37 causes object 3 to be lifted clear of its foot 9 with at least a part of the weight of the object rollingly supported on the wheel. Due to the shape of the bar 37, the bar is naturally guided into horizontal slot portion 43 after the caster has been fully moved to its lowered position. Upon release of the bar, the weight of the object and the bias of spring S force the bar upwardly in slot portion 43 and positively maintains the caster in its lowered position.

When object 3 has been rollingly moved on caster assemblies 25 to its desired position, the caster assemblies may be readily moved to their retracted positions by the operator again placing his foot on the bar 37 and forcing the bar downwardly. Then the operator moves the bar out of horizontal slot portion 43 and by removing his foot from the bar, the bias of spring S and the weight of the object will force the bar upwardly within vertical slot portion 41 thus relieving weight from the caster assembly and lowering foot 9 into solid engagement with the floor. With the caster in its retracted position, it will be understood that the caster need not be necessarily raised clear of the floor, but rather that it does not carry any substantial part of the weight of object 3. It will be further understood that the casters of this invention, when installed on the legs of an object, may be adjusted so that when casters are actuated, the casters will raise their respective legs an equal height above the floor.

As shown, mounting flanges 15a, 15b and the various side and other walls of caster frame 13 are formed of heavy gauge sheet metal. The various wall members may be positively secured together by bending tabs T in place to secure the various components to one another and by spot welding of the various members together where they overlap. As shown in FIG. 2, mounting flanges 15a, 15b are adapted to fit flush on the inside of flanges 5a, 5b of object support stand leg 3. However, as is well known in the art, other shapes of mounting flanges may be provided so as to enable the caster assembly 1 of the present invention to be fitted on the outside of an object to be rollingly supported thereby.

In view of the above, it will be seen that the several objects and features of the present invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

I claim:

1. In a retractable caster assembly for rollingly supporting an object, such as a power tool or the like, thereby to enable the object to be readily moved on the floor, said caster assembly including a caster frame adapted to be rigidly secured to said object and a caster carried by the frame and movable relative thereto between a raised retracted position in which the caster is substantially free of the weight of the object and in which the object adjacent the caster assembly solidly bears on the floor and a lowered position in which said caster bears upon the floor and supports at least a part of the weight of the object, wherein the improvement comprises: said caster frame having a pair of spaced side walls, one of said side walls having a generally vertically extending slot therein, a bar pivotally secured to the other of said side walls, said bar extending from other said side wall through said slot in said one side wall and out beyond said one side wall, said slot having a generally vertical portion and another portion horizontally offset from said vertical portion, said caster having a stem slidably received within said caster frame and being cammingly engaged by said bar as said bar is pivotally moved downwardly within said slot thereby to effect movement of the caster relative to said caster frame toward its lowered position, with said caster in its lowered position, said bar being movable in sidewise direction and from said vertical slot portion into said other slot portion thereby to lock said caster in its lowered position.

2. In a retractable caster assembly as set forth in claim 1 wherein said bar extends out beyond said other side wall a distance sufficient so as to be engageable by an operator's foot for effecting movement of said caster from its retracted to its lowered position.

3. In a retractable caster assembly as set forth in claim 1 wherein said bar is hinged with respect to said other side wall for rotation in a generally vertical plane for vertical movement within said vertical slot portion and yet is hinged in such manner so as permit limited horizontal movement of the bar thereby to enable bar to move into said horizontally offset slot portion.

4. In a retractable caster assembly as set forth in claim 1 wherein said slot is generally J-shaped with said vertical slot portion constituting the stem of said J-shape slot and with said horizontally offset portion constituting the hook portion of said J-shaped slot.

5. In a retractable caster assembly as set forth in claim 4 wherein said one side wall includes a locking tab which defines at least in part a portion of the upper edge of said horizontally offset slot portion whereby with said bar received in horizontally offset slot portion said bar must first be moved downwardly to move said bar clear of said tab before said bar may be moved from said horizontally offset slot portion into said vertical slot portion.

6. In a retractable caster assembly as set forth in claim 1 wherein each of said side walls includes one of said slots and means for pivotally mounting said bar on one of said side walls whereby said bar can be selectively mounted to extend out beyond either one of said side walls.

7. In a retractable caster assembly as set forth in claim 1 wherein said bar has a cam surface formed thereon cammingly engageable with the upper end of said caster stem for forceably moving said caster downwardly with respect to said caster frame.

8. In a retractable caster assembly as set forth in claim 3 wherein said bar has a hinge pin hole adapted to receive a hinge pin for hingedly pivotally connecting said bar to said one side wall, said hinge pin hole being of somewhat larger cross-section than the cross-section of said hinge pin thereby to permit limited horizontal movement of the bar with respect to the hinge pin as well as vertical swinging movement.

9. A retractable caster assembly adapted to be secured to an object, such as a power tool or the like, said caster assembly including a caster frame and a caster, said caster being movable relative to said caster frame between a retracted position in which said caster is substantially free of the weight of the object supported thereby and a lowered position in which said caster rollingly supports at least part of the weight of the object, said caster frame being of sheet metal or the like adapted to be rigidly secured to said object, said caster frame having a pair of spaced side walls and a bottom wall rigidly secured to the side walls, a bar, at least one of said side walls having means for pivotally mounting said bar relative to one side wall, the other of said side walls having a slot therein for receiving said bar, the said bar extending from said one side wall through the slot in the other of said side walls and beyond said other side wall, said slot having a generally vertical portion and a horizontal portion offset from said vertical portion, the closed end of said horizontal slot portion being disposed at least slightly above the open end thereof and being adapted to positively lock said bar therein when said caster is in its lowered position and is supporting at least part of the weight of said object, said caster having an elongate stem extending vertically therefrom, said bottom wall having means for slidably receiving said stem therein and for permitting vertical sliding movement of the caster relative to the caster frame between a raised position and a lowered position in which said caster is adapted to engage the floor and to rollingly carry at least part of the weight of said object, said stem being cammingly engaged by bar as said bar is moved pivotally downwardly within said vertical slot portion and as said bar is moved horizontally into said horizontal slot portion thereby to forcefully effect movement of said caster to its lowered position and to positively lock said caster in its said lowered position.

* * * * *